Dec. 29, 1931. B. K. GILLESPIE 1,838,823
APPARATUS FOR TREATING AND HANDLING AUTOMOBILES
Filed Dec. 16, 1927 5 Sheets-Sheet 2

Inventor:
Bee K. Gillespie
By Rector, Hibben, Davis & Macauley Attys

Dec. 29, 1931. B. K. GILLESPIE 1,838,823
APPARATUS FOR TREATING AND HANDLING AUTOMOBILES
Filed Dec. 16, 1927 5 Sheets-Sheet 3

Inventor:
Bee K. Gillespie
Rector, Hibben, Davis & Macauley
Attys

Dec. 29, 1931.  B. K. GILLESPIE  1,838,823
APPARATUS FOR TREATING AND HANDLING AUTOMOBILES
Filed Dec. 16, 1927  5 Sheets-Sheet 5

Patented Dec. 29, 1931

1,838,823

UNITED STATES PATENT OFFICE

BEE K. GILLESPIE, OF CHICAGO, ILLINOIS, ASSIGNOR TO GILLESPIE AUTO LAUNDRY SYSTEM, INC., OF CHICAGO, ILLINOIS, A CORPORATION OF DELAWARE

APPARATUS FOR TREATING AND HANDLING AUTOMOBILES

Application filed December 16, 1927. Serial No. 240,486.

My invention relates to apparatus for treating and handling automobiles, and the like, and has to do more particularly with novel enclosure structure adapted to receive a plurality of automobiles at one time, each being separately located for different treatments, such as oiling and greasing; fueling; washing and polishing; motor, body and tire repair; and any other treatment to which automobiles as a whole may be subjected.

It is well known that in many districts, particularly, the larger cities, the most desirable ground space for building purposes is limited and such space must be conserved. It is very desirable that service stations for servicing, and otherwise treating, automobiles be located within these limited districts and, particularly, within or close to business districts; but this cannot always be done because of the rather large and unavailable ground space required. One of the objects of my invention is to take care of a condition such as just explained, and to provide apparatus for treating and servicing automobiles of such character that it may be installed upon relatively small ground space, such apparatus including, in part, a building structure arranged with a main driveway and a plurality of compartments so arranged along the sides and at the end thereof that a large number of automobiles may be placed therein and subjected to the same or different treatments at the same time.

Another object is to provide such a building structure wherein the side compartments are arranged to receive vehicles directly from the main driveway, and the end compartment is adapted to receive a vehicle laundry structure through which the vehicle passes and from which it emerges completely cleaned and polished, such laundry structure being so arranged that a plurality of grease or lubricating racks are confined within its limits; and wherein the main driveway is of such width that the vehicles may be moved therealong toward and from any and all of said compartments without interference one with the other, or without interference with or between the workmen having to do with the different treatments.

A further object is to provide a structure of the above character which may be built very cheaply without impairing efficiency of the apparatus in any direction, and which is adapted to lessen the time required to ordinarily apply the various treatments to the automobiles, thereby reducing the cost to the automobile owner.

Still another object is to provide novel means for positioning the automobiles within and removing them from the various compartments; and to this end, I may provide readily and quickly movable conveyor platform devices in the compartments adapted to swing to and from the main driveway to receive the automobiles and carry them to and from the compartments.

An additional object is to combine a large number of different services under one roof in a small space. I accomplish this, in part, by limiting the length and width of the compartments; namely, the compartments are only of such length and width that the vehicle may be received therein with sufficient additional space to permit the operators to carry out their work readily and quickly. The size of these compartments may be so limited that it would be impracticable to attempt to manipulate the vehicle to position the same within the compartments; but by employing the swingable conveyor platforms above referred to, the vehicles may be readily and quickly positioned within the compartments without interference of other vehicles. Furthermore, by so limiting the width of these compartments, the driveway therealong may be of great width to facilitate movement of vehicles therealong.

Other objects and advantages will become apparent as this description progresses, and by reference to the drawings, wherein,—

With particular reference to the form of my invention shown in Figs. 1 to 13, inclusive, I provide a rectangularly shaped enclosure structure consisting of (Fig. 1) a floor surface 20, side walls 21, end walls 22 and roof 23, the latter having an arched central portion 23a. The interior of this enclosure is provided with a wide central driveway 24 extending from the central front sliding doors 25 to the wash rack 26 at the rear. The interior of the enclosure is further divided into a plurality of compartments 27 located end to end along the sides of the driveway, and which are adapted to receive automobiles for various servicing operations, such as motor repair, body repair, tire repair, and the like. These compartments are formed by vertical partition walls 28 which extend inwardly from the side walls 21 toward the main driveway. These partitions, preferably, extend only to such height as to conceal the workmen and the vehicle in one compartment from those in the adjacent compartment, but if desired, they may extend to the roof. For the purpose of incorporating a maximum number of compartments within a small enclosure, the partition walls are preferably, but not necessarily, in all instances, spaced apart and extend toward the driveway only to such an extent as to provide compartments which will readily receive the vehicle and permit the operators to work thereupon. These compartments may be of such small size that it will be impracticable for an operator to attempt to manipulate the vehicle in an ordinary way to position the same within. Each side compartment has a work bench 27a carried by the side wall portion therein.

Figure 1:
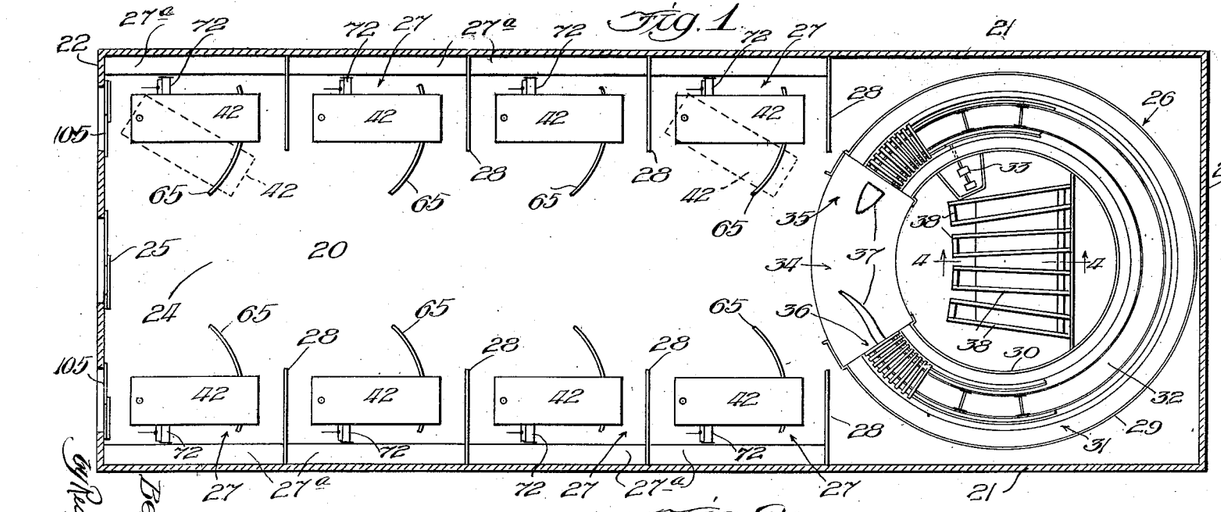
Figure 1 is a sectional plan view of an enclosure embodying my invention.
Figures 2, 3:
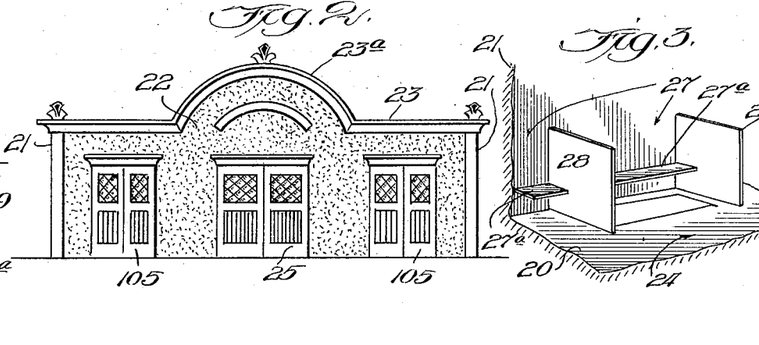
Fig. 2 is a front elevation of the structure of Fig. 1.
Fig. 3 is a perspective view of a portion of the interior of the enclosure of Fig. 1 and showing one of the side compartments thereof.

The wash rack is preferably, but not necessarily, of the construction disclosed in Letters Patent No. 1,613,213, granted to Louis J. Wilde and Bee K. Gillespie, on January 4, 1927, for apparatus for cleaning and polishing automobiles, and it comprises generally concentric circular walls 29 and 30 forming a circular washing and polishing chamber 31 which receives a circular and movable platform 32 for supporting and conveying an automobile bodily through the compartment. Motion is transmitted to the track platform 32 by driving mechanism 33 which may take any suitable form. In the operation of this structure, the car may be driven through the front doors 25 and along the driveway onto the stationary wash rack platform 34 and into the washing chamber at the left as indicated by the arrow 35. The movable wash rack platform may be revolving continuously in clockwise direction and, at intervals, as the car is carried through the chamber 31, suitable apparatus and operators act upon the car and it emerges through the exit 36 and is deposited upon the stationary platform 34 completely cleaned and polished. It will be understood that, if desired, the wash rack platform may be moved in an anti-clockwise direction instead of clockwise as indicated. Guides 37 are employed at the entrance and exit from the wash rack chamber to aid in properly delivering the vehicle to and from the stationary platform.

Figures 4, 5:
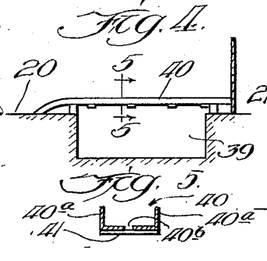
Fig. 4 is a vertical section taken substantially on line 4—4 of Fig. 1 and showing one of the grease racks in elevation.
Fig. 5 is a vertical section taken substantially on line 5—5 of Fig. 4.
Figure 6:
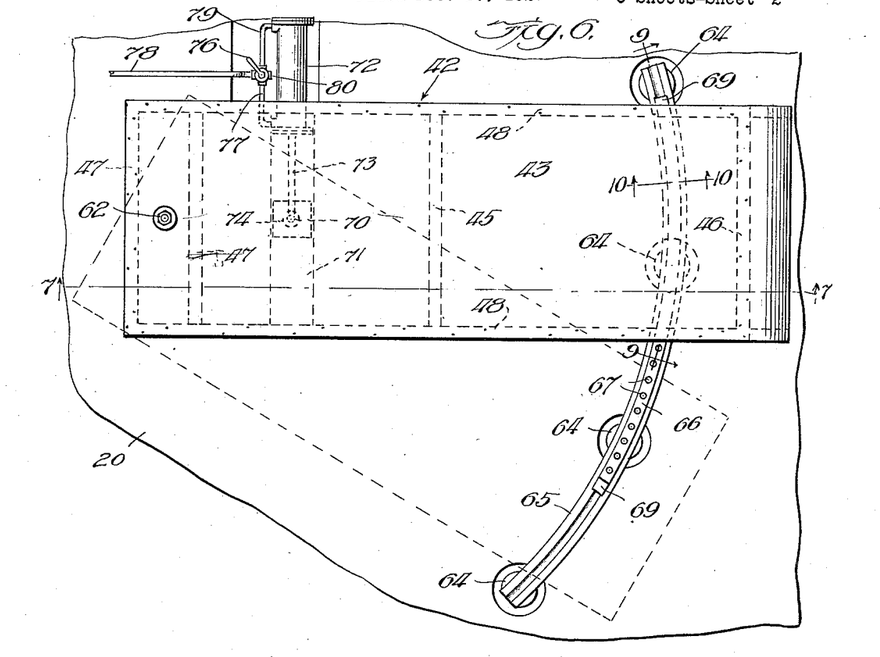
Fig. 6 is an enlarged separated plan view of one of the side compartments shown in Fig. 1; the swinging platform being shown within the compartment in full lines and swung outwardly in communication with the main driveway in dotted lines.
Figure 7:
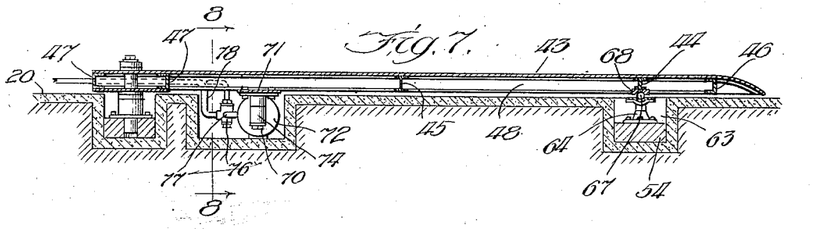
Fig. 7 is a vertical section lengthwise of the swinging platform taken substantially on line 7—7 of Fig. 6.
Figure 8:
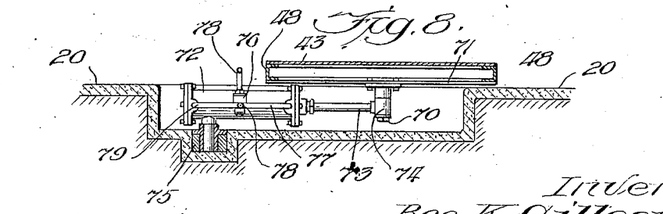
Fig. 8 is a transverse section taken substantially on line 8—8 of Fig. 7.
Figure 9:
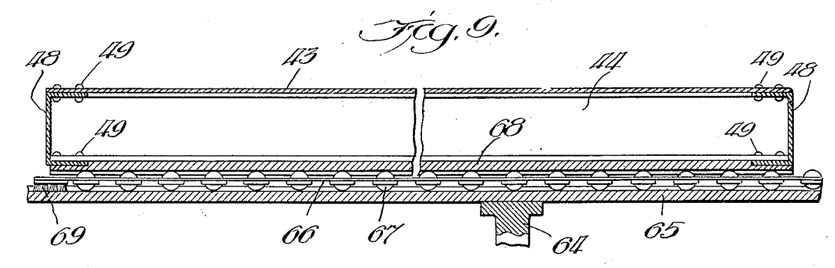
Fig. 9 is an enlarged vertical section taken transversely through the front end of the platform and through the supporting track structure substantially on line 9—9 of Fig. 6.
Figure 10:
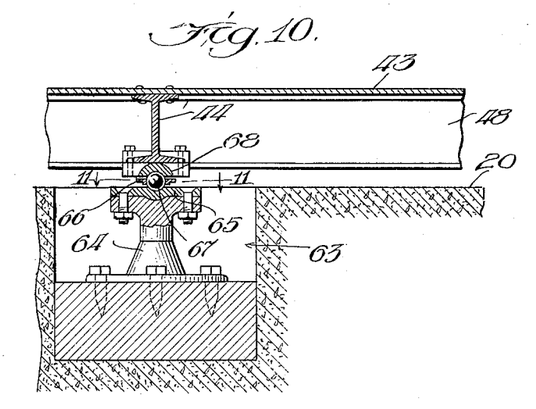
Fig. 10 is an enlarged vertical section taken lengthwise through an end portion of the platform substantially on line 10—10 of Fig. 6.
Figure 11:
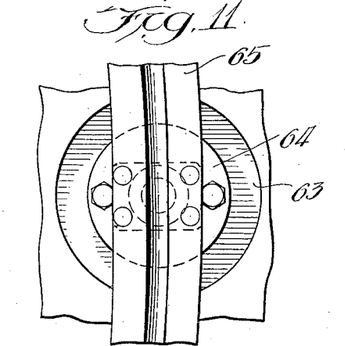
Fig. 11 is an enlarged horizontal section taken substantially on line 11—11 of Fig. 10 and showing a portion of the track structure which supports the front end of the platform.
Figure 12:
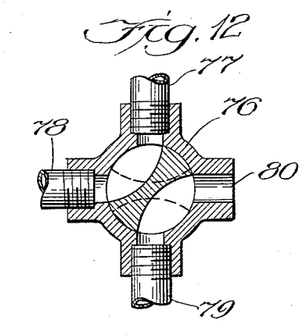
Fig. 12 is a partial diagrammatic view of the valve mechanism for controlling the flow of fluid pressure to and from the platform operating cylinder.
Figure 13:
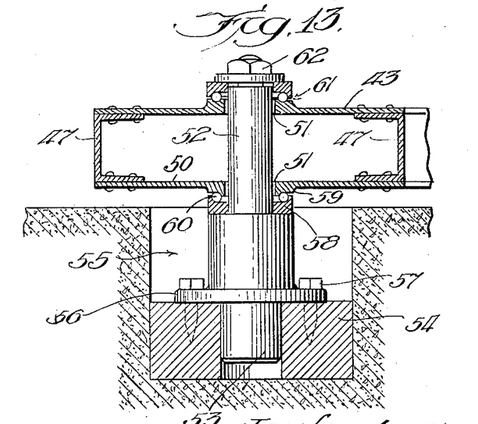
Fig. 13 is an enlarged transverse vertical section taken through the rear end of the swinging platform and clearly showing the arrangement of the supporting pin structure.

To aid in compactness and permit of ready handling of vehicles without interference, the central part of the wash rack, within the inner circular compartment wall 30, is provided with a plurality of grease or lubricating racks 38 which are mounted over a pit 39 (Fig. 4). These grease racks may take any desired form, but I, preferably, employ a rack structure such as disclosed in Figs. 4 and 5 and which consists of spaced channel sections 40 each formed of a pair of angle bars 40ª joined together in slightly spaced relation by a plurality of spaced cross strips 41. The front ends of these bars 40ª are turned downwardly toward the floor surface 24 so that the vehicle may be driven thereupon and into an elevated position above the pit 39. The longitudinal space 40ᵇ between the angle bars 40ª permits dirt, etc., to be swept from the channel tracks 40 therethrough into the pit beneath instead of upon the floor surface at the entrance to the rack. This keeps the floor surface clean. If desired, the pit 39 may be dispensed with and the well-known form of hydraulic-operated grease racks employed instead of the racks shown.

To provide for readily and quickly positioning the vehicles within the comparatively shallow side compartments, each of these compartments is provided with a platform 42 (Fig. 1) swingable toward and from the main driveway to receive cars therefrom and deposit them thereon. This platform arrangement (Figs. 6 to 13, inclusive) consists of a flat metal plate 43 of such length, width and thickness as to accommodate vehicles of maximum size and weight. This metal plate 43 is supported upon the spaced I-beams 44 and 45 and the front and rear channel strips 46 and 47. Channel strips 48 are secured along the sides of the platform to the cross channel strips 46 and 47 and the I-beams 44 and 45 by rivets 49 (Fig. 9) or other suitable fastening devices. The end of the metal vehicle-supporting plate 43 is turned downwardly at its forward end toward the floor surface 20 to readily receive the vehicle therefrom; or, if desired, this turned down portion may take the form of a separate tip suitably secured to the metal plate 43.

The rear end of the platform is swingingly supported by a king pin structure (Figs. 7 and 13) which will now be described. A lower metal plate 50 (Fig. 13) is carried by the rear cross channel strips 47, and this plate together with the vehicle supporting plate 43 thereabove are provided with aligned openings 51 adapted to receive the upper reduced end of the king pin 52. The lower end of this king pin is also reduced to enter an opening 53 in the base block 54 located in the floor pit 55, the pin being provided with a horizontal flange 56 adjacent the latter reduced portion which rests upon the base block and is secured in position thereon by suitable fastening devices 57. A ball race element 58 is carried by the pin at the base of the upper reduced portion and a similar element 59 is carried by the under cross plate 50 forming a ball race which receives the balls 60 and provides a non-friction pivot support for the platform. The platform is further secured to this king pin by a similar ball bearing 61 carried by the platform plate 43 and the outer end of the pin, all being secured by a nut 62 engaging a still further reduced and threaded pin end.

The front end of the platform is swingingly supported by an anti-friction roller structure for movement to and from the driveway 24 (Figs. 7, 9, 10 and 11). A pit 63 is provided beneath the forward end of the platform, and it carries an arcuate row of spaced supports 64. These supports carry an arcuate and grooved track 65 which freely receives a free movable ball bearing unit including a ball retainer 66 and balls 67. The front I-beam 44 is shaped to the curvature of the under track 65 and carries a ball-groove member 68 which rests and rides upon the balls 67. The ball retainer and groove members are of such length that the platform will be carried and supported thereby over its entire width throughout its full swinging movement. If desired, stops (not shown) may be provided for limiting the extent of swing of the platform. Brushes 69 are carried at the opposite ends of and by the ball retainer 66 and project downwardly into engagement with the grooved track 65, so as to sweep the same clean as the platform is swung back and forth.

The platform may be swung manually, if desired, and the above roller bearing arrangement enables the operator to accomplish this readily and quickly regardless of the weight of the car. However, I prefer to move this platform by hydraulic or fluid pressure means. In the drawings (Figs. 7 and 8), I have shown an arrangement for accomplishing this which comprises a pivot pin 70 dependently carried by an under cross plate 71 carried by the longitudinal channel side pieces 48. In this instance, I employ fluid pressure as the motive means and provide a cylinder 72 of ordinary form having a piston therein with a piston rod 73 projecting through the head of the cylinder and carrying a collar 74 rotatably engaging the pin 70. The cylinder 72 is pivotally mounted upon block 75 as clearly indicated in Fig. 8 to provide a compound pivot action to compensate for the arcuate travel of the platform.

The piston rod 73 is reciprocated by supplying fluid pressure to the cylinder on one side of the piston and exhausting from the opposite side in a well-known manner. For example, the valve 76 (Fig. 12) may be used to control the fluid pressure flow through the pipes 77, 78 and 79; that is, with the valve in the position shown in Fig. 8, fluid pressure is supplied through pipes 77 and 78 to the front of the piston and the fluid pressure at the rear of the piston is exhausted through pipe 79 and exhaust 80, and the platform is swung into the compartment. To swing the platform outward to the dotted line position of Fig. 6, the valve 76 is operated to reverse the admission and exhaust of fluid pressure.

Figure 14:
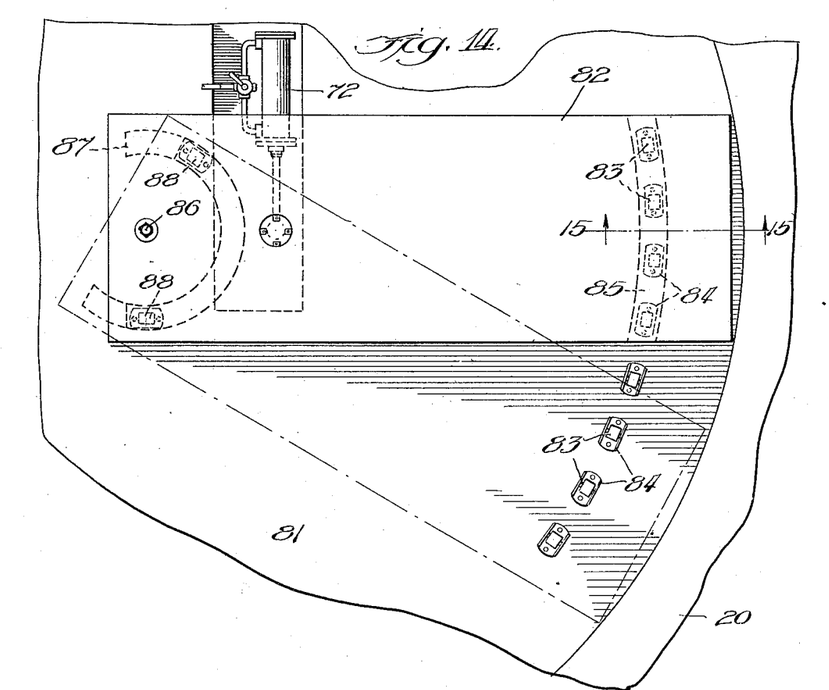
Fig. 14 is a plan view of another form of swinging platform which may be used in the side compartments, the platform being shown in full lines within the compartment and shown in dotted lines swung toward the main driveway.
Figure 15:
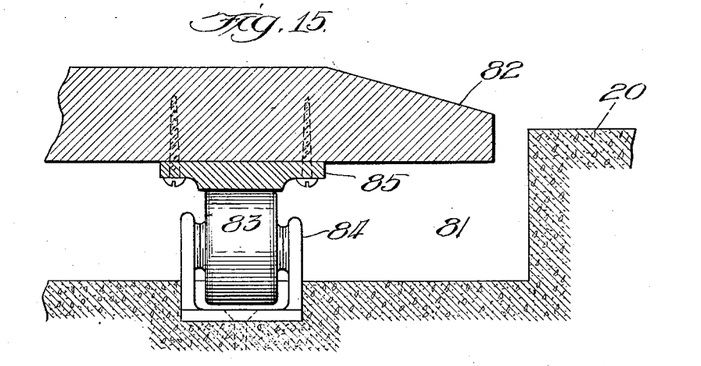
Fig. 15 is an enlarged vertical section through the front end of the platform and its supporting structure, and taken substantially on line 15—15 of Fig. 14.

In Figs. 14 and 15, I show another form of swinging platform and supporting mechanism therefor. In this form, I employ an arcuate pit 81 adapted to receive the lower part of the swingable platform 82 which may be formed of wood or other suitable material. The forward end of this platform tapers downwardly toward the floor level so that the automobile may be readily received thereupon. An arcuate row of spaced rollers 83 are mounted upon the bottom of the pit 81, each roller having, preferably, a ball bearing mounting (not shown) upon a yoke support 84 secured to the pit bottom. An arcuate track plate 85 is mounted on the underside of the platform at its forward end in the path of the rollers 83. This track plate rides over these rollers in the movement of the platform back and forth; and these rollers are so spaced that a strong anti-friction support is afforded for the front end of the platform across its entire width and throughout its entire swinging movement.

To further support the platform (Fig. 14), I provide at the rear thereof on the underside, in front of the king pin 86 another semi-circular track plate 87 which rides upon rollers 88 similar in construction and mounting to the rollers 83. Further construction and operation of this form of platform mechanism is the same as that of the form shown in Figs. 1 to 13, inclusive.

Figure 16:
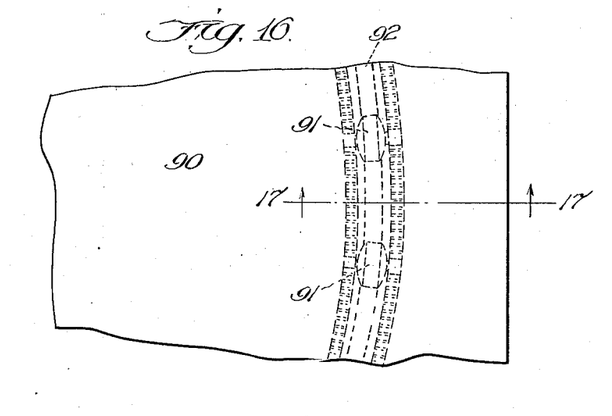
Fig. 16 is a plan view of a portion of an additional form of swinging platform.
Figure 17:
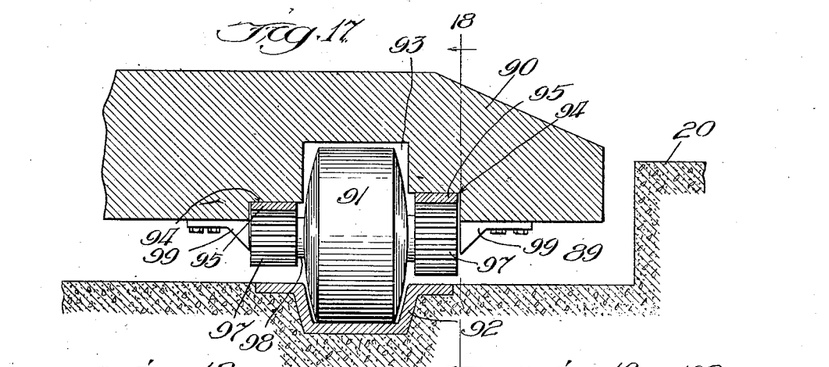
Fig. 17 is an enlarged vertical section taken substantially on line 17—17 of Fig. 16.
Figure 18:
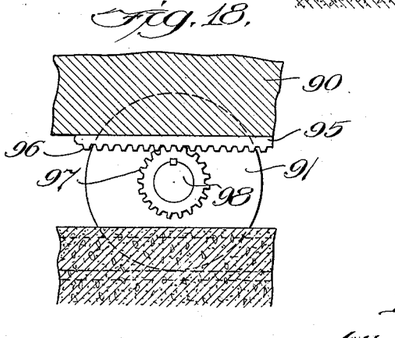
Fig. 18 is a section taken substantially on line 18—18 of Fig. 17.

Figs. 16, 17 and 18 illustrate an additional form of platform structure which includes a pit 89 and platform 90 similar to that shown in Figs. 14 and 15. In this latter form, the general construction of the platform may be similar to that of the previous figures, the principal difference being in the anti-friction means of supporting the front end of the platform. With reference to Fig. 16, it will be seen that I may employ a plurality of free rollers 91 which move along upon an arcuate and channel track 92 in the pit 89. The underside of the platform, directly above the arcuate track 92, is provided with an arcuate recess which is of an inverted T-shape in cross section providing an inwardly extending channel 93 adapted to receive (in spaced relation) the upper part of the rollers 91, and lateral recesses 94 at the bottom to receive opposed arcuate track plates 95. The underside of each of these track plates 95 is corrugated or provided with teeth 96 adapted to mesh with corrugated or toothed rings 97 carried by the projecting ends of the roller axles 98. The outer of the toothed rings 97 is larger, as shown in Fig. 17, to compensate for the difference in travel between the inner and outer of these rings as will be well understood. The rollers 91 are fixed upon the axles 98 so that, as the platform rolls along upon the same and the track 92, there will be a slower rolling movement as between the smaller-diameter axles 88 and the platform. In other words, due to the difference in diameters of the axle 98 and the roller 91, one complete revolution of the roller will cause the platform to travel a considerably greater distance relative to the track 92 than the platform will travel relative to the roller 91. For example, the relative diameters of the roller and the axle might be such in the complete swinging movement of the platform, that the platform will travel say only 12 or 15 inches relative to the roller and the roller will be carried only a short distance from its original position. This feature further adds to the rigidness of the support throughout the width of the entire swing of the platform, as well as aiding in the positiveness of the swinging movement. Thrust plates 99 may be secured to the bottom of the platform at the ends of the axles 98 to more positively position such axles against lateral strains and stresses. The corrugated construction as between the axles 98 and the plates 95 causes the axles to move in a predetermined manner without slipping; however, in some instances such corrugated construction may be dispensed with.

Figure 19:
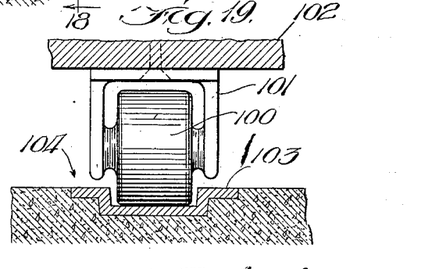
Fig. 19 is a transverse vertical section of still another form of supporting structure for the swinging platform.

Fig. 19 shows another form of roller construction somewhat similar to that shown in Figs. 14 and 15, but which is mounted in a reverse position, more particularly the roller 100 and its support 101 are secured to the underside of the platform 102 and moved therewith during the swinging of the platform upon the channel track 103 carried in the floor pit 104 therebeneath.

In all of the forms shown in Figs. 14 to 19, inclusive, the general operation, except as otherwise stated, is the same as that of the form of Figs. 1 to 13, inclusive.

It is believed that the advantages of my invention are obvious. A large number of cars can be assembled in the enclosure at the same time without interfering with the positioning, moving and servicing of the cars. This may be done quickly. A central driveway wide enough to permit several cars to pass leads to the circular wash rack. Cars may enter the washing chamber in the wash rack and emerge thoroughly cleaned and polished and then pass to the outside through the entrance doors 25; or may be placed in one of the side compartments for further treatment. Or, the car may be driven upon the driveway 24, and the platform in the desired side compartment swung toward the driveway to receive the car after which it is swung back to its normal side position,—all without interfering with the movement of other cars. The space required for the entire enclosure, even if small, accommodates conveniently a large number of cars. The small and shallow compartments aid in this respect. For further convenience, side entrance sliding doors 105 may be provided leading to the front side compartments; and, in that event, the swinging platforms may, if desired, be omitted in these front compartments.

While I have shown several forms of structure for carrying out my invention, it will be understood that various other and further changes in details and arrangement of parts may be made without departing from the spirit and scope of my invention as defined by the claims which follow.

I claim:

1. In apparatus of the character described, an enclosure structure having a central driveway, a plurality of zones on the opposite sides of said driveway and means located in each zone and movable toward and from said driveway and adapted to support automobiles during movement from said driveway to a position in said zones.

2. In apparatus of the character described, a walled enclosure structure having a central driveway, means associated with said enclosure for forming a plurality of zones on the opposite sides of said driveway and means located in said zones and movable toward and from said driveway and adapted to support automobiles from said driveway and position the same in said side zones, said latter means comprising a platform track, means for pivotally supporting one end of said track, roller bearing means for supporting the other end of said track and a mechanism connected to said track for swinging it about said pivot means.

3. In apparatus of the character described, an enclosure structure having a driveway, means for forming a plurality of areas along the opposite sides of said driveway, a supporting platform in each area adapted to support automobiles from said driveway and position the same in said side areas, an anti-friction pin structure for pivotally supporting one end of said platform, a grooved track at the other end, a plurality of roller devices carried in the groove of said track and supporting said other end of said platform, and a fluid pressure actuated piston device for swinging said platform about its pivot upon said roller devices and track.

4. In apparatus of the character described, an enclosure structure having a driveway, means for forming a plurality of zones along the opposite sides of said driveway, a supporting platform in each zone, an anti-friction pin structure for pivotally supporting one end of said platform, a grooved track at the other end, a plurality of roller devices carried in the groove of said track and supporting said other end of said platform, a fluid pressure actuated piston device for swinging said platform about its pivot upon said roller devices and track, and means for sweeping said track as said platform is moved back and forth.

5. In apparatus of the character described, an enclosure having an entrance, a driveway in communication with said entrance, compartments arranged along said driveway and being in communication therewith, a platform in each of said compartments swingable into communication with said driveway and mechanism for supporting said platform including a grooved track and roller devices freely mounted in said groove and upon which said platform freely rides.

6. In apparatus of the character described, an enclosure having an entrance, a driveway in communication with said entrance, compartments arranged along said driveway and being in communication therewith, a platform in each of said compartments swingable into communication with said driveway and mechanism supporting said platform comprising a track and a ball retainer carrying a plurality of spaced balls freely disposed upon said trackway with said balls in contact with such trackway and said platform also resting thereon.

7. In apparatus of the character described, an enclosure having an entrance, a driveway in communication with said entrance, compartments arranged along said driveway and being in communication therewith, a platform in each of said compartments swingable into communication with said driveway and mechanism for supporting said platform comprising a track support from said platform and having a groove, another track carried by said platform and having a groove, and free rollers each operating in both said grooves and over which said platform rides.

8. In apparatus of the character described, an enclosure having one zone in communication with another and means for supporting and transferring an object from one zone to the other comprising a swingable platform and mechanism for swinging the platform back and forth including a cylinder having a rotatable mounting, and a piston and piston rod, and a rotatable connection between said piston rod and platform.

9. In apparatus of the character described, an enclosure having one zone in communication with another, means for supporting and transferring an object from one zone to the other comprising a swingable platform and mechanism for swinging the platform back and forth including a cylinder and a compound pivotal connection between said zone and platform.

10. In apparatus of the character described, an enclosure having a plurality of areas with a common entranceway in such relation thereto that a vehicle cannot enter the areas normally from said entranceway in a direct path without contacting with an adjoining area, and means in said areas for moving the vehicle thereinto directly, including a platform swingingly attached at one end and having the other free end supported on anti-friction rolls.

11. In apparatus of the character described, an enclosure having a driveway and an entrance leading thereto, means for dividing said enclosure into zones along the sides of said driveway, said means being of such character that said zones are of sufficient length and width only to receive a vehicle and permit workmen to move freely thereabout and into which the vehicle may not be moved freely by ordinary manipulation thereof and means in said zones movable to and from said driveway for receiving and supporting a vehicle and positioning the same within said zones or upon said driveway.

12. In apparatus of the character described, an enclosure having a central driveway adapted to accommodate a plurality of automobiles, means for forming a plurality of automobile work zones arranged along each side of said driveway, means located in each of said zones for receiving from the driveway an automobile and positioning the same in said zone, said means comprising a turntable adapted to be projected into the driveway to receive an automobile and carry the same to position within the zone.

In testimony whereof, I have subscribed my name.

BEE K. GILLESPIE.